(12) United States Patent
Shin et al.

(10) Patent No.: US 12,360,809 B2
(45) Date of Patent: Jul. 15, 2025

(54) ACCELERATOR RESOURCE MANAGEMENT METHOD AND APPARATUS

(71) Applicants: Samsung Electronics Co., Ltd., Suwon-si (KR); SNU R&DB FOUNDATION, Seoul (KR)

(72) Inventors: Sanggyu Shin, Seoul (KR); Soojeong Kim, Seoul (KR); Byung-Gon Chun, Seoul (KR); Kyunggeun Lee, Seoul (KR)

(73) Assignees: Samsung Electronics Co., Ltd., Suwon-si (KR); SNU R&DB Foundation, Seoul (KR)

( * ) Notice: Subject to any disclaimer, the term of this patent is extended or adjusted under 35 U.S.C. 154(b) by 297 days.

(21) Appl. No.: 17/372,613

(22) Filed: Jul. 12, 2021

(65) Prior Publication Data
US 2022/0237040 A1    Jul. 28, 2022

(30) Foreign Application Priority Data

Jan. 25, 2021    (KR) .................. 10-2021-0010450

(51) Int. Cl.
| | |
|---|---|
| G06F 3/06 | (2006.01) |
| G06F 1/3228 | (2019.01) |
| G06F 9/38 | (2018.01) |
| G06F 9/48 | (2006.01) |
| G06F 9/50 | (2006.01) |
| G06F 9/52 | (2006.01) |
| G06N 3/08 | (2023.01) |

(52) U.S. Cl.
CPC .......... *G06F 9/5027* (2013.01); *G06F 9/4881* (2013.01); *G06F 9/52* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 8,869,160 B2 | 10/2014 | Dillenberger et al. | |
| 9,176,794 B2 | 11/2015 | Cheng et al. | |
| 10,133,597 B2 | 11/2018 | Tian et al. | |
| 11,218,912 B2* | 1/2022 | Lee | H04W 28/0273 |
| 11,675,621 B2* | 6/2023 | Kim | G06F 9/4881 |
| | | | 718/103 |
| 12,052,183 B1* | 7/2024 | Traer Clark | H04L 47/762 |

(Continued)

FOREIGN PATENT DOCUMENTS

| | | |
|---|---|---|
| JP | 3740728 B2 | 2/2006 |
| JP | 3959516 B2 | 8/2007 |

(Continued)

*Primary Examiner* — Hyun Nam
(74) *Attorney, Agent, or Firm* — NSIP Law (57) ABSTRACT

An accelerator resource management method and apparatus are disclosed. The accelerator resource management method includes receiving a task request for a neural network-related task and a resource scheduling policy for the neural network-related task, obtaining information on a current resource utilization status of an accelerator cluster comprising a plurality of accelerators, in response to the task request, and allocating an accelerator resource for performing the task based on a utility of a resource allocation that is based on the resource scheduling policy and the information.

19 Claims, 6 Drawing Sheets

(56) References Cited

U.S. PATENT DOCUMENTS

| | | | | |
|---|---|---|---|---|
| 12,204,554 | B1* | 1/2025 | Meduri | G06F 16/252 |
| 12,259,976 | B1* | 3/2025 | Mercado-Alcala | G06F 21/53 |
| 2007/0016614 | A1* | 1/2007 | Novy | G06F 40/154 |
| 2012/0054771 | A1* | 3/2012 | Krishnamurthy | G06F 9/4881 |
| | | | | 718/105 |
| 2012/0233315 | A1* | 9/2012 | Hoffman | G06F 9/5072 |
| | | | | 709/224 |
| 2013/0097605 | A1* | 4/2013 | Martinka | G06F 12/0276 |
| | | | | 718/100 |
| 2013/0152099 | A1* | 6/2013 | Bass | G06F 9/5038 |
| | | | | 718/103 |
| 2014/0165060 | A1* | 6/2014 | Muller | G06F 9/45558 |
| | | | | 718/1 |
| 2014/0380318 | A1* | 12/2014 | Bykov | G06F 9/465 |
| | | | | 718/100 |
| 2015/0178129 | A1* | 6/2015 | Dube | G06F 9/4881 |
| | | | | 718/106 |
| 2017/0048827 | A1* | 2/2017 | Zhang | H04W 76/14 |
| 2017/0293994 | A1* | 10/2017 | Li | G06F 9/5083 |
| 2018/0198855 | A1* | 7/2018 | Wang | G06F 9/5083 |
| 2018/0329943 | A1* | 11/2018 | Li | G06F 9/5027 |
| 2019/0130326 | A1* | 5/2019 | Carley | G06F 11/3457 |
| 2019/0179678 | A1* | 6/2019 | Banerjee | G06F 9/5072 |
| 2019/0289514 | A1* | 9/2019 | Ronen | H01Q 3/08 |
| 2020/0104230 | A1* | 4/2020 | Hasija | G06F 11/3072 |
| 2020/0174840 | A1* | 6/2020 | Zhao | G06F 9/5011 |
| 2021/0099913 | A1* | 4/2021 | Lee | H04W 28/0908 |
| 2021/0117803 | A1* | 4/2021 | Husain | G06N 3/082 |
| 2021/0209235 | A1* | 7/2021 | Dande | G06N 20/00 |
| 2021/0392143 | A1* | 12/2021 | Cheng | H04L 41/0893 |
| 2022/0141026 | A1* | 5/2022 | Smith | H04L 9/085 |
| | | | | 713/181 |
| 2022/0155480 | A1* | 5/2022 | Mishra | E21B 49/00 |
| 2022/0214902 | A1* | 7/2022 | Zhao | G06F 9/4856 |
| 2022/0237040 | A1* | 7/2022 | Shin | G06N 3/063 |
| 2022/0292303 | A1* | 9/2022 | Cao | G06F 9/505 |
| 2025/0104326 | A1* | 3/2025 | Appu | G06T 15/005 |

FOREIGN PATENT DOCUMENTS

| | | |
|---|---|---|
| JP | 4129988 B2 | 8/2008 |
| JP | 4621087 B2 | 1/2011 |
| KR | 10-1644958 B1 | 8/2016 |
| KR | 10-1695013 B1 | 1/2017 |
| KR | 10-1987661 B1 | 6/2019 |
| KR | 10-2011402 B1 | 8/2019 |
| KR | 10-2019-0132475 A | 11/2019 |
| KR | 10-2064882 B1 | 1/2020 |
| KR | 10-2140730 B1 | 8/2020 |

\* cited by examiner

ACCELERATOR RESOURCE MANAGEMENT METHOD AND APPARATUS

CROSS-REFERENCE TO RELATED APPLICATIONS

This application claims the benefit under 35 USC § 119(a) of Korean Patent Application No. 10-2021-0010450 filed on Jan. 25, 2021, in the Korean Intellectual Property Office, the entire disclosure of which is incorporated herein by reference for all purposes.

BACKGROUND

Field

The following description relates to a memory management method and apparatus for a neural network operation.

Description of Related Art

For a typical deep learning-based distributed learning in a multi-tenant cluster environment, a fixed quantity of accelerator resources is allocated to a task from start to end.

Thus, this distributed learning may proceed by using fixed resources after receiving initially allocated resources without utilizing an idle resource generated in a cluster, and thus its efficiency may be degraded.

When a resource return command is received from a task scheduler configured to manage tasks in a task queue, all the resources may be returned and remain idle in the task queue, even when returning only a portion of the resources in use is available.

For example, in a case in which the minimum resources required for a new task are five accelerators and there are only four idle resources, waiting may occur or a task that is already executed may need to return all resources and wait, even though the new task is possible to be executed when another task that is already executed returns only one accelerator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an accelerator resource management method, including receiving a task request for a neural network-related task and a resource scheduling policy for the neural network-related task, obtaining information on a current resource utilization status of an accelerator cluster comprising a plurality of accelerators, in response to the task request, and allocating an accelerator resource for performing the task based on a utility of a resource allocation that is based on the resource scheduling policy and the information.

The resource scheduling policy may include any one or any combination of a policy on a cost for using the accelerator cluster needed for the task, a policy on a time used for the task, and a policy on a throughput of the task.

The obtaining of the information may include obtaining information on another task being executed in the accelerator cluster and information on an idle resource of the accelerator cluster.

The obtaining of the information may include obtaining the information by performing a peer discovery between the plurality of accelerators.

The allocating of the accelerator resource may include estimating the utility based on the resource scheduling policy and the information, and performing the task by allocating, to the task, target accelerators that correspond to a portion of the plurality of accelerators based on the estimated utility.

The estimating of the utility may include any one of estimating a utility for an additional allocation of the accelerator resource to the task based on the resource scheduling policy and the information, or estimating a utility of a return of the accelerator resource by determining whether the task continues in response to the return of the accelerator resource based on the resource scheduling policy and the information.

The performing of the task may include determining the target accelerators from among the plurality of accelerators based on the utility, and allocating, to the target accelerators, metadata for performing the task.

The performing of the task may include determining whether the utility increases by the allocation of the target accelerators, and performing the task by allocating the target accelerators to the task, in response to an increase in the utility.

The allocating of the accelerator resource may include synchronizing neural network parameters between the target accelerators.

The task may include neural network-based distributed learning.

In another general aspect, there is provided an accelerator resource management apparatus, including a receiver configured to receive a task request for a neural network-related task and a resource scheduling policy for the neural network-related task, and a processor configured to obtain information on a current resource utilization status of an accelerator cluster comprising a plurality of accelerators in response to the task request, and to allocate an accelerator resource for performing the task based on a utility of a resource utility that is based on the resource scheduling policy and the information.

The resource scheduling policy may include any one or any combination of a policy on a cost for using the accelerator cluster needed for the task, a policy on a time used for the task, and a policy on a throughput of the task.

The processor may be configured to obtain information on another task being executed in the accelerator cluster and information on an idle resource of the accelerator cluster, in response to the task request.

The processor may be configured to obtain the information by performing a peer discovery between the plurality of accelerators.

The processor may be configured to estimate the utility based on the resource scheduling policy and the information, and perform the task by allocating, to the task, target accelerators that correspond to a portion of the plurality of accelerators based on the estimated utility.

The processor may be configured to estimate a utility for an additional allocation of the accelerator resource to the task based on the resource scheduling policy and the information, or estimate a utility of a return of the accelerator resource by determining whether the task continues in response to the return of the accelerator resource based on the resource scheduling policy and the information.

The processor may be configured to determine the target accelerators from among the plurality of accelerators based on the utility, and allocate, to the target accelerators, metadata for performing the task.

The processor may be configured to determine whether the utility increases by the allocation of the target accelerators, and perform the task by allocating the target accelerators to the task, in response to an increase in the utility.

The processor may be configured to synchronize neural network parameters between the target accelerators.

The task may include neural network-based distributed learning.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for the purpose of describing particular examples only and is not to be limiting of the examples. As used herein, the singular forms (for example, "a", "an", and "the") are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or a combination thereof, but do not preclude the presence or addition of one or more other features, integers, steps, operations, elements, components, numbers, and/or combinations thereof.

The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

Figure 1:
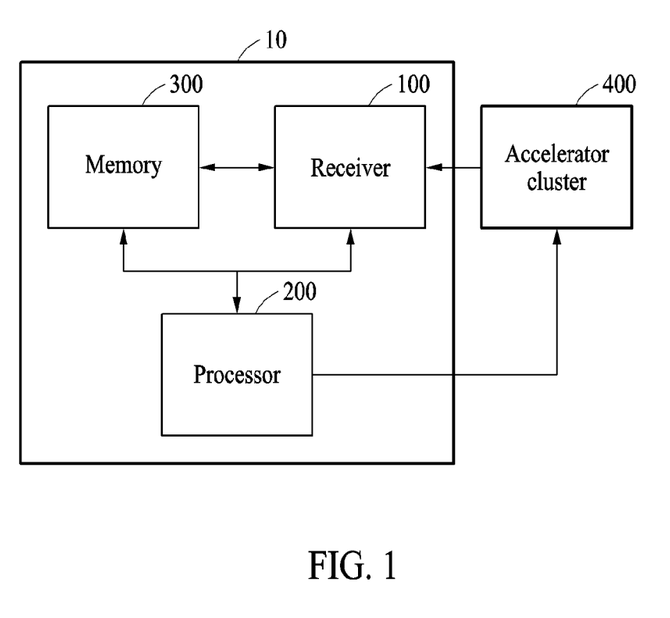
FIG. 1 illustrates an example of an accelerator resource management apparatus.

FIG. 1 illustrates an example of an accelerator resource management apparatus.

Referring to FIG. 1, an accelerator resource management apparatus 10 may manage accelerator resources. An accelerator described herein may refer to a hardware or computer system that is specially designed to accelerate a neural network application.

The accelerator resource management apparatus 10 may manage hardware resources of accelerators included in an accelerator cluster 400.

The accelerator resource management apparatus 10 may receive a current accelerator utilization status from the accelerator cluster 400, and manage the accelerator cluster 400 based on the received current accelerator utilization status. The accelerator cluster 400 may include a plurality of accelerators.

An accelerator may include, for example, a graphics processing unit (GPU), a neural processing unit (NPU), a field-programmable gate array (FPGA), an application-specific integrated circuit (ASIC), or an application processor (AP). The accelerator may also be embodied by a software such as a virtual machine running on hardware.

The accelerator resource management apparatus 10 may process a neural network operation using the accelerator cluster 400. The accelerator resource management apparatus 10 may use resources of the accelerator cluster 400 to perform neural network-based learning and inferences.

A neural network, or an artificial neural network (ANN), described herein may generate mapping between input patterns and output patterns, and may have a generalization capability to generate a relatively correct output with respect to an input pattern that has not been used for training. The neural network may indicate an overall model having a problem-solving ability as artificial neurons or nodes constituting the network through synaptic connections change the intensity of the synaptic connections through learning.

A neuron of the neural network may include a combination of weights or biases. The neural network may include one or more layers including one or more neurons or nodes. The neural network may infer a result that is desired to be predicted from an input by changing a weight of a neuron through learning.

The neural network may include a deep neural network (DNN) including a plurality of layers and may be simply referred to as a neural network. The plurality of layers may include an input layer, hidden layers, and an output layer. For example, the neural network may include, for example, any one or any combination of a convolutional neural network (CNN), a recurrent neural network (RNN), a perceptron, a multilayer perceptron, a feedforward (FF) network, a radial basis function (RBF) network, a deep FF (DFF) network, a long short-term memory (LSTM), a gated recurrent unit (GRU), an autoencoder (AE), a variational AE (VAE), a denoising AE (DAE), a sparse AE (SAE), a Markov chain (MC), a Hopfield network (HN), a Boltzmann machine (BM), a restricted BM (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN). In an example, at least a portion of the plurality of layers in the neural network may correspond to the CNN, and another portion thereof may correspond to the FCN. In this case, the CNN may be referred to as convolutional layers, and the FCN may be referred to as fully connected layers.

The accelerator resource management apparatus 10 includes a receiver 100 and a processor 200. The accelerator resource management apparatus 10 further includes a memory 300. The accelerator resource management apparatus 10 may be provided inside or outside the accelerator cluster 400.

The receiver 100 may include a receiving interface. The receiver 100 may receive an accelerator resource utilization state or a current accelerator resource utilization status from the accelerator cluster 400. In an example, the receiver 100 may receive the current accelerator resource utilization status from the accelerator cluster 400 at the request of the processor 200.

The receiver 100 may receive a task request for a neural network-related task and a resource scheduling policy on the neural network-related task. The neural network-related task, or simply a task, may include a task associated with learning or inferences of a neural network. The task may include, for example, distributed learning of a neural network.

The resource scheduling policy may include a priority and a restraint for performing scheduling on the hardware resources of the accelerators included in the accelerator cluster 400. The resource scheduling policy may include a policy on a cost for using an accelerator cluster needed for a neural network-related task, a policy on a time used for the task, a throughput for the task, or a policy on a combination thereof. That is, the resource scheduling policy may include a combination of a plurality of policies. For example, the resource scheduling policy may include a restraint on a time used for a task, a restraint on a throughput for performing the task, a maximum number of available accelerators, or a priority between speed and cost for performing the task.

The receiver 100 may output, to the processor 200, the received current accelerator resource utilization status, task request, or resource scheduling policy.

The processor 200 may process data stored in the memory 300. The processor 200 may execute a computer-readable code (e.g., software) stored in the memory 300 and instructions induced by the processor 200.

The processor 200 may be a hardware-implemented data processing device having a physically structured circuit to execute desired operations. For example, the desired operations may be implemented by the execution of code or instructions included in a program.

The hardware-implemented generation apparatus may include, for example, a microprocessor, a central processing unit (CPU), single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a processor core, a multi-core processor, and a multiprocessor, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. Further description of the processor 200 is given below.

When the task request is received, the processor 200 may obtain information on the current accelerator resource utilization status of the accelerator cluster 400 including the plurality of accelerators. When the task request is received, the processor 200 may also obtain information on another task being executed in an accelerator cluster and information on idle resources of the accelerator cluster.

The processor 200 may obtain the information on the current resource utilization status of the accelerator cluster 400 by performing a peer discovery between the accelerators. The peer discovery may refer to a process of verifying a set of accelerators (or workers or worker processes) that perform a common task.

The peer discovery may refer to a task of data synchronization between workers allocated to the same task through a centralized protocol when an accelerator (or a worker or worker process) is added or eliminated. For example, when some worker processes are eliminated, the eliminated worker processes may be recognized through the peer discovery, and remaining workers may share or take tasks that need to be distributed. The processor 200 may perform the peer discovery even when a plurality of tasks is simultaneously performed in the accelerator cluster 400.

The processor 200 may allocate accelerator resources for performing a task based on a utility of a resource allocation that is based on the resource scheduling policy and the information on the current resource utilization status. The processor 200 may estimate the utility based on the resource scheduling policy and the information on the current resource utilization status.

For example, the processor 200 may estimate the utility when an accelerator resource is additionally allocated to the task based on the resource scheduling policy and the information on the current resource utilization status. In another example, the processor 200 may estimate the utility by determining whether to continue the task or not when an accelerator resource is returned based on the resource scheduling policy and the information on the current resource utilization status. The utility described herein may refer to a task performance that is improved by an allocation of an accelerator resource. For example, the utility may include a task time reduced by the allocation of an accelerator resource, a task speed increased by the allocation of an accelerator resource, or an amount of consumption of an operation resource that is reduced by the allocation of an accelerator resource.

The processor 200 may perform the task by allocating, to the task, a target accelerator which corresponds to at least a portion of the accelerators based on the utility. The processor 200 may determine the target accelerator from among the accelerators based on the utility. The processor 200 may allocate, to the target accelerator, metadata for performing the task. The target accelerator may refer to an accelerator determined to perform the task that is based on the task request.

The processor 200 may determine whether the utility increases or not by the allocation of the target accelerator. The processor 200 may allocate the target accelerator to the task based on whether the utility increases or not to perform the task.

The processor 200 may synchronize neural network parameters between target accelerators which correspond to at least a portion of the accelerators.

The memory 300 may store instructions (or a program) executable by the processor 200. The instructions may include, for example, instructions for executing an operation of the processor 200 and/or instructions for executing an operation of each component of the processor 200.

The memory 300 may be embodied by a volatile or nonvolatile memory device.

The volatile memory device may be embodied as, for example, a dynamic random-access memory (DRAM), a static RAM (SRAM), a thyristor RAM (T-RAM), a zero-capacitor RAM (Z-RAM), or a twin-transistor RAM (TTRAM).

The nonvolatile memory device may be embodied as, for example, an electrically erasable programmable read-only memory (EEPROM), a flash memory, a magnetic RAM (MRAM), a spin-transfer torque (STT) MRAM (STT-MRAM), a conductive bridging RAM (CBRAM), a ferroelectric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory.

Figure 2:
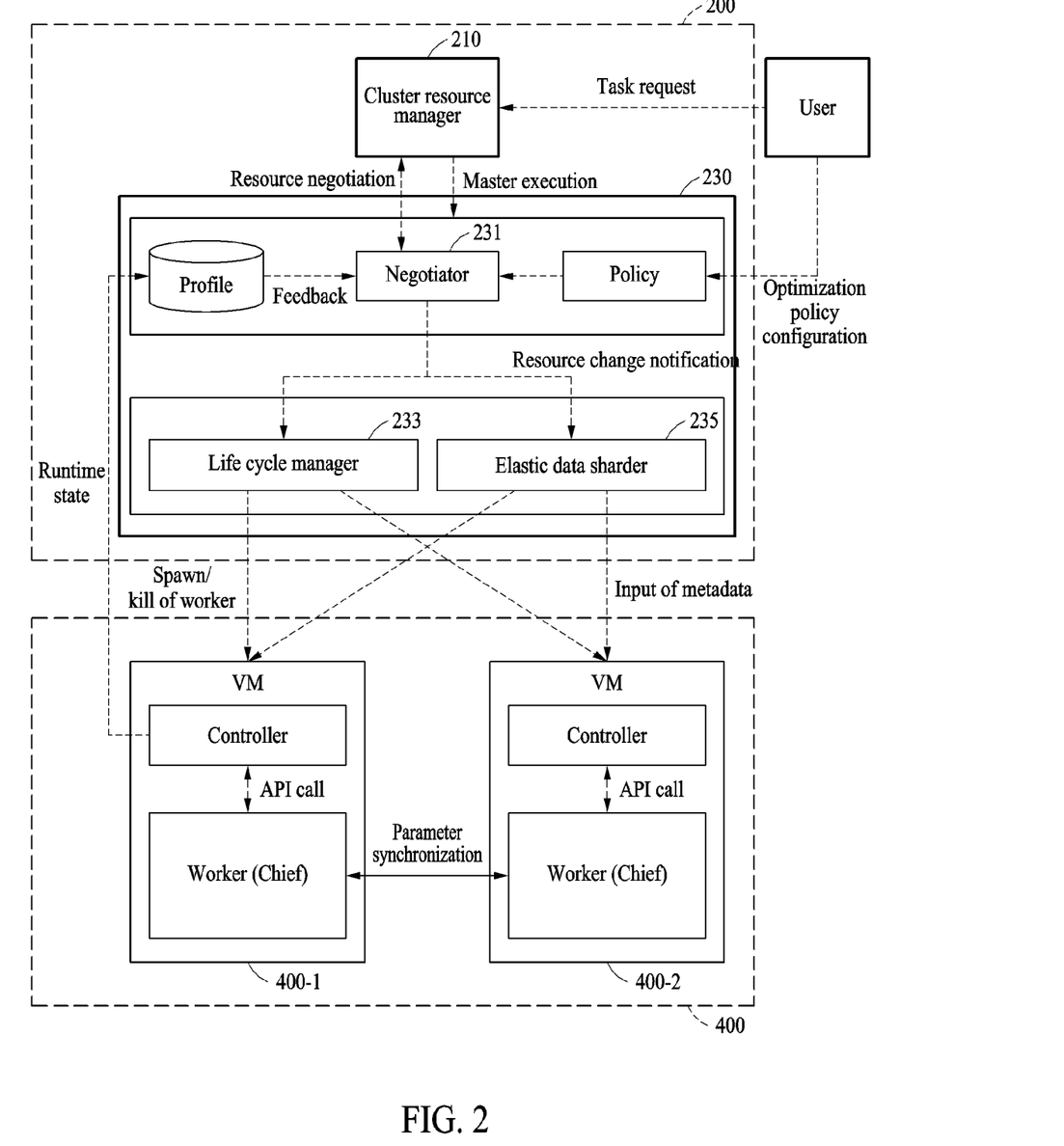
FIG. 2 illustrates an example of an operation of the accelerator resource management apparatus illustrated in FIG. 1.

FIG. 2 illustrates an example of an operation of the accelerator resource management apparatus 10 illustrated in FIG. 1.

Referring to FIG. 2, the accelerator resource management apparatus 10 may receive a resource scheduling policy from a user and manage accelerator resources to effectively perform a neural network-related task.

Accelerator resources of the accelerator cluster 400 may be used by a plurality of users, and thus a current resource utilization status of the accelerator cluster 400 may change in real time. The processor 200 may effectively utilize idle resources in the accelerator cluster 400 (e.g., a multi-tenant accelerator cluster) of which available resources change in real time, and thus increase a resource utilization efficiency of the accelerator cluster 400 and improve a potential issue that may arise from task scheduling.

In the accelerator cluster 400 (e.g., a multi-tenant accelerator cluster), a plurality of tasks may be added or terminated in real time. Thus, an amount of available accelerator resources may change in real time. Thus, the processor 200 may flexibly allocate accelerator resources that change in real time, thereby improving the performance in processing a neural network-related task.

After initially allocating a resource to a neural network-related task of distributed learning, when the processor 200 receives an additional resource allocation offer or proposal in response to an occurrence of an idle resource in the accelerator cluster 400, a distributed learning manager may predict a marginal utility of an additional resource. When the additional resource is determined to increase a utility function, the additional resource may be accepted and the task may be expanded, improving the performance.

When the processor 200 receives a task request from one or more users that use the accelerator cluster 400, the processor 200 may receive, as an input, a basic number of required accelerators and an upper limit of cost. The processor 200 may perform learning by allocating basic accelerator resources based on the received basic number of required accelerators and upper limit of cost.

In an example, the processor 200 may receive information on a current accelerator resource utilization status from the accelerator cluster 400. When an additional resource of the accelerator cluster 400 is available, the processor 200 may then expand accelerator resources for a task being performed and allocate a greater amount of resources.

The processor 200 may determine whether to allocate an additional resource by estimating a utility of a resource allocation based on a resource scheduling policy and information on a current accelerator resource utilization status. For example, the processor 200 may verify whether a learning speed increases through runtime profiling, and restrict the additional resource allocation when the learning speed does not increase therefrom or an upper limit of cost is exceeded.

When the processor 200 receives a resource return command from a scheduler, the processor 200 may return only a portion of resources when it is available to return only a portion of resources in use, and reduce a task and resume learning using remaining resources.

The processor 200 includes a cluster resource manager 210 and a master 230. The master 230 includes a negotiator 231, a life cycle manager 233, and an elastic data sharder 235.

The cluster resource manager 210 may determine accelerators that are to perform a task requested from a user from among accelerators included in the accelerator cluster 400, and transmit information of the determined accelerators to the master 230. The cluster resource manager 210 may execute the master 230.

The negotiator 231 may receive an optimization policy configuring request for the task requested from the user. The negotiator 231 may set a policy in response to the optimization policy configuring request from the user.

The policy may include a policy on a cost for use of an accelerator cluster, a policy on a time used for a task, or a policy on a throughput for the task. For example, the policy may include information associated with, for example, the number of required accelerators, a maximum cost limit, and the like.

When the policy (e.g., an optimization goal for a learning speed, a cluster usage fee, etc.) is received from the user, the negotiator 231 may generate a feasible resource negotiation policy and intelligently negotiate with the cluster resource manager 210 about resources.

When the negotiator 231 transmits the task request to the cluster resource manager 210 after setting the policy, the cluster resource manager 210 may execute the master 230 configured to perform central management and negotiate with the negotiator 231 about resources when the task request is received from the user.

The negotiator 231 may perform a negotiation comprehensively based on the policy set by the user, tasks currently being executed in the accelerator cluster 400, and information on a current accelerator resource utilization status.

When the negotiation is completed and resources are allocated by the cluster resource manager 210, the negotiator 231 may transmit resource information associated with the resources allocated by the cluster resource manager 210 to the life cycle manager 233 and the elastic data sharder 235.

The life cycle manager 233 may execute accelerators included in the accelerator cluster 400 based on the allocated resources. The life cycle manager 233 may spawn or kill a worker in a virtual machine.

As described above, an accelerator may be implemented using a virtual machine environment. The life cycle manager 233 may process a neural network-related task using a virtual machine 400-1 and a virtual machine 400-2. The virtual machine 400-1 may include a controller and a worker. A worker described herein may refer to a task executed in an accelerator.

The elastic data sharder 235 may divide metadata for processing the task requested by the user and allocate the divided metadata to an accelerator included in the accelerator cluster 400. The metadata may include a neural network weight, a gradient, or a momentum.

The elastic data sharder 235 may divide and allocate data required for the task such that a plurality of accelerators does not process the task redundantly.

The runtime profiling may be performed periodically or nonperiodically even while the task (e.g., neural network learning) is being performed, and thus the negotiator 231 may continuously perform a negotiation about an addition or return of resources.

The accelerators included in the accelerator cluster 400 may perform a parameter synchronization.

The processor 200 may provide an effective automatic scaling mechanism that automatically expands or reduces a scale of a task based on a change in available accelerator resources through the resource management described above.

When available resources are changed, the processor 200 may automatically add or eliminate an accelerator (or worker) that participates in learning. When available resources are changed, the processor 200 may re-perform a peer discovery through a centralized protocol, and perform a parameter synchronization between accelerators in the presence of a newly added accelerator (or worker).

When expanding or reducing a neural network-related task using an elastic input pipeline mechanism, the processor 200 may prevent duplicate processing or omitted or missing processing of a dataset associated with the task.

An elastic input pipeline may be involved in the division of input metadata, and each accelerator (or worker) may receive metadata associated with a set of a portion of the task-related dataset to be processed by the accelerator (or worker) from an input pipeline management device such as the elastic data sharder 235 included in a centralized master, and perform the task based on the received metadata.

The processor 200 may provide a resource negotiation policy and mechanism of performing a resource negotiation with the cluster resource manager 210 based on various optimization goals of users for the utilization of accelerator resources.

Figure 3:
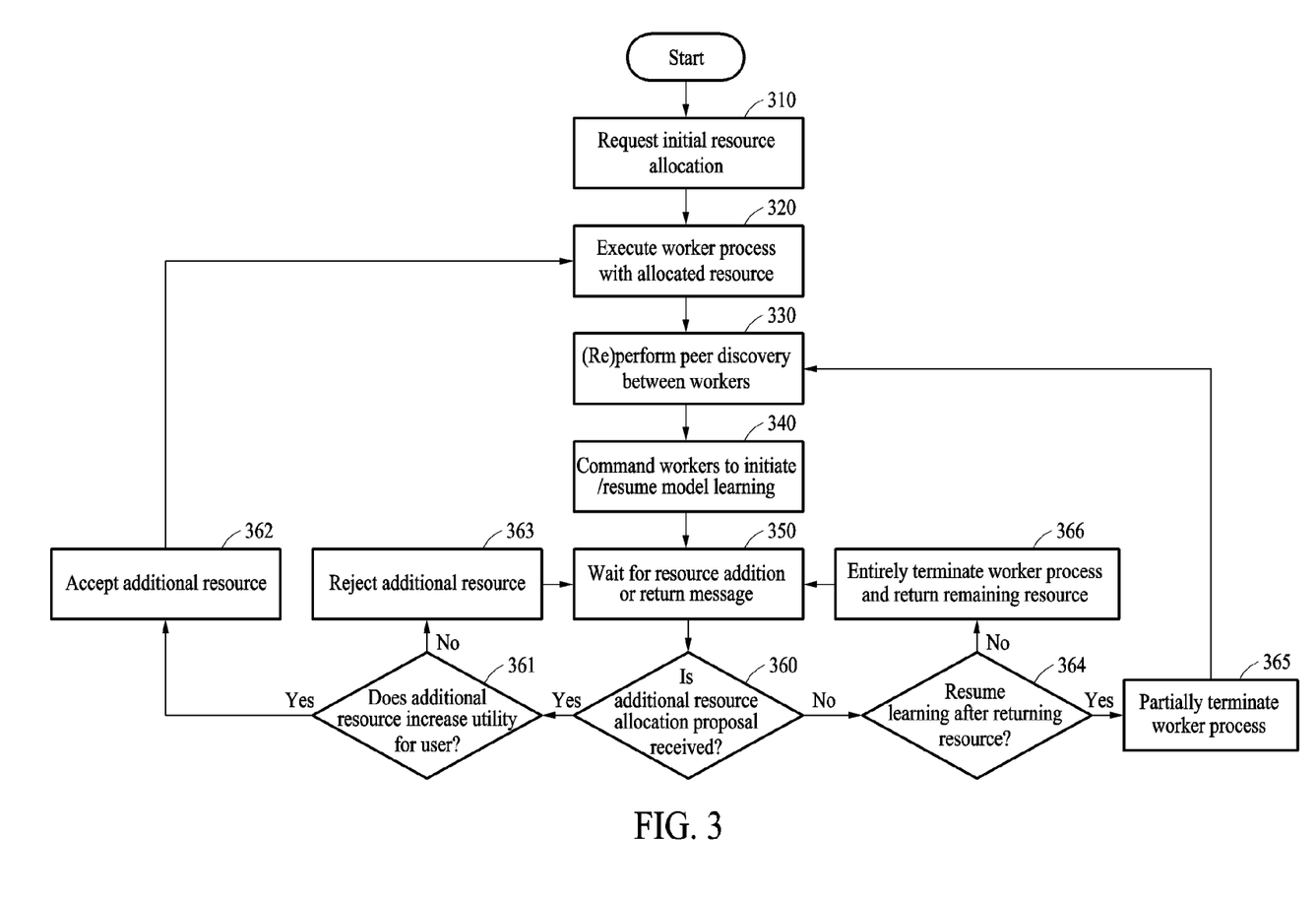
FIG. 3 illustrates an example of a flow of resource management operations for distributed learning.

FIG. 3 illustrates an example of a flow of resource management operations for distributed learning.

Referring to FIG. 3, in operation 310, the processor 200 receives an initial accelerator resource allocation request. In operation 320, the processor 200 executes a worker process (or an accelerator) with an initially allocated accelerator resource.

In operation 330, the processor 200 performs a peer discovery between workers. In operation 340, the processor 200 transmits a command for initiating or resuming learning of a neural network model to the workers.

In an example, as described above with reference to FIG. 2, the processor 200 may distribute metadata to a plurality of workers and transmit a command for performing neural network distributed learning.

In operation 350, the processor 200 waits for an accelerator resource addition or return message. The processor 200 may receive information on a current accelerator resource utilization status in real time during a task (e.g., neural network distributed learning).

In operation 360, the processor 200 determines whether an additional accelerator resource allocation proposal or offer is received or not. In operation 361, when the additional accelerator resource allocation proposal is received, the processor 200 determines whether an accelerator resource that is to be additionally allocated increases a utility for a user.

In operation 362, when it is determined that the utility for the user increases, the processor 200 accepts the addition of the accelerator resource. In operation 363, when it is determined that the utility for the user does not increase, the processor 200 rejects the addition of the accelerator resource.

In operation 364, when the additional accelerator resource allocation proposal is not received, the processor 200 returns the accelerator resource of the accelerator cluster 400 and determines whether the neural network distributed learning is resumable or not.

In operation 365, when it is determined that the learning is resumable, the processor 200 partially terminates the worker process. In operation 366, when it is determined that the learning is not resumable, the processor 200 entirely terminates the worker process and returns a remaining accelerator resource. In operation 330, after the return of the remaining accelerator resource, the processor 200 re-performs a peer discovery between workers.

Figure 4A:
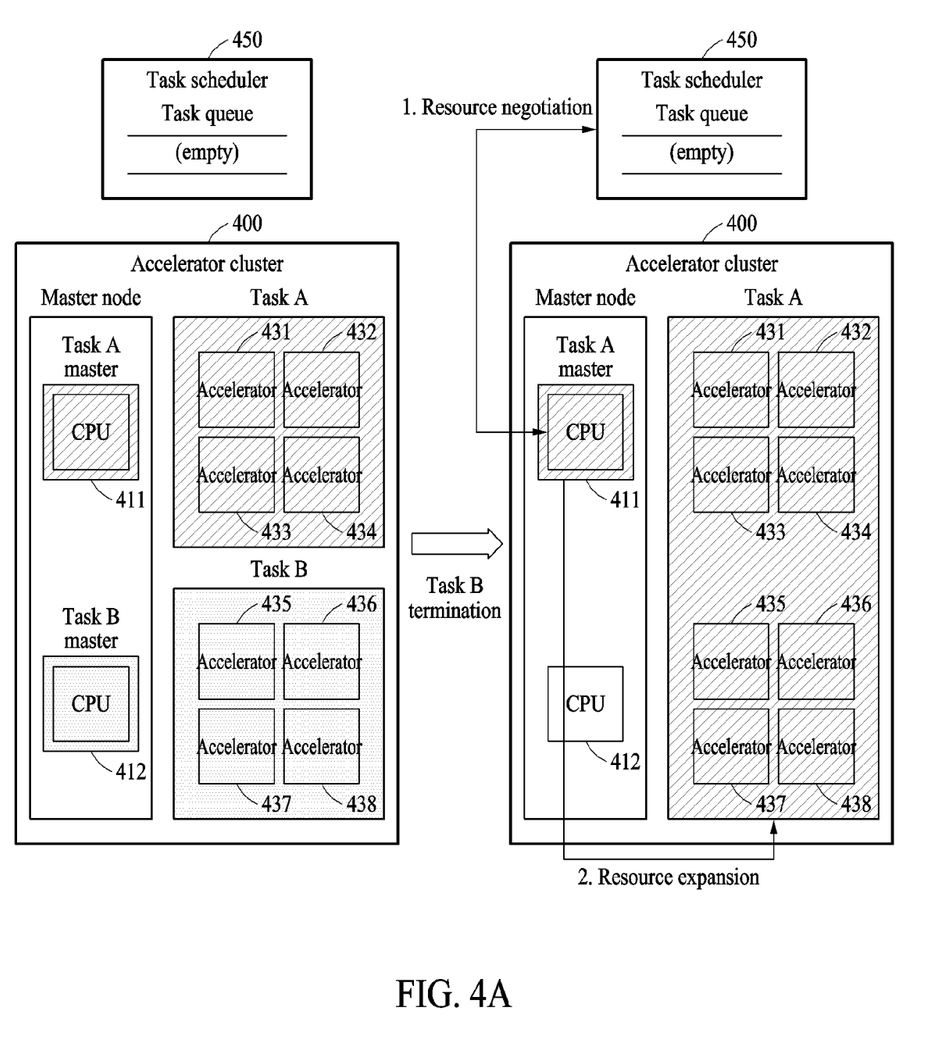
FIG. 4A illustrates an example of an allocation of an accelerator resource.
Figure 4B:
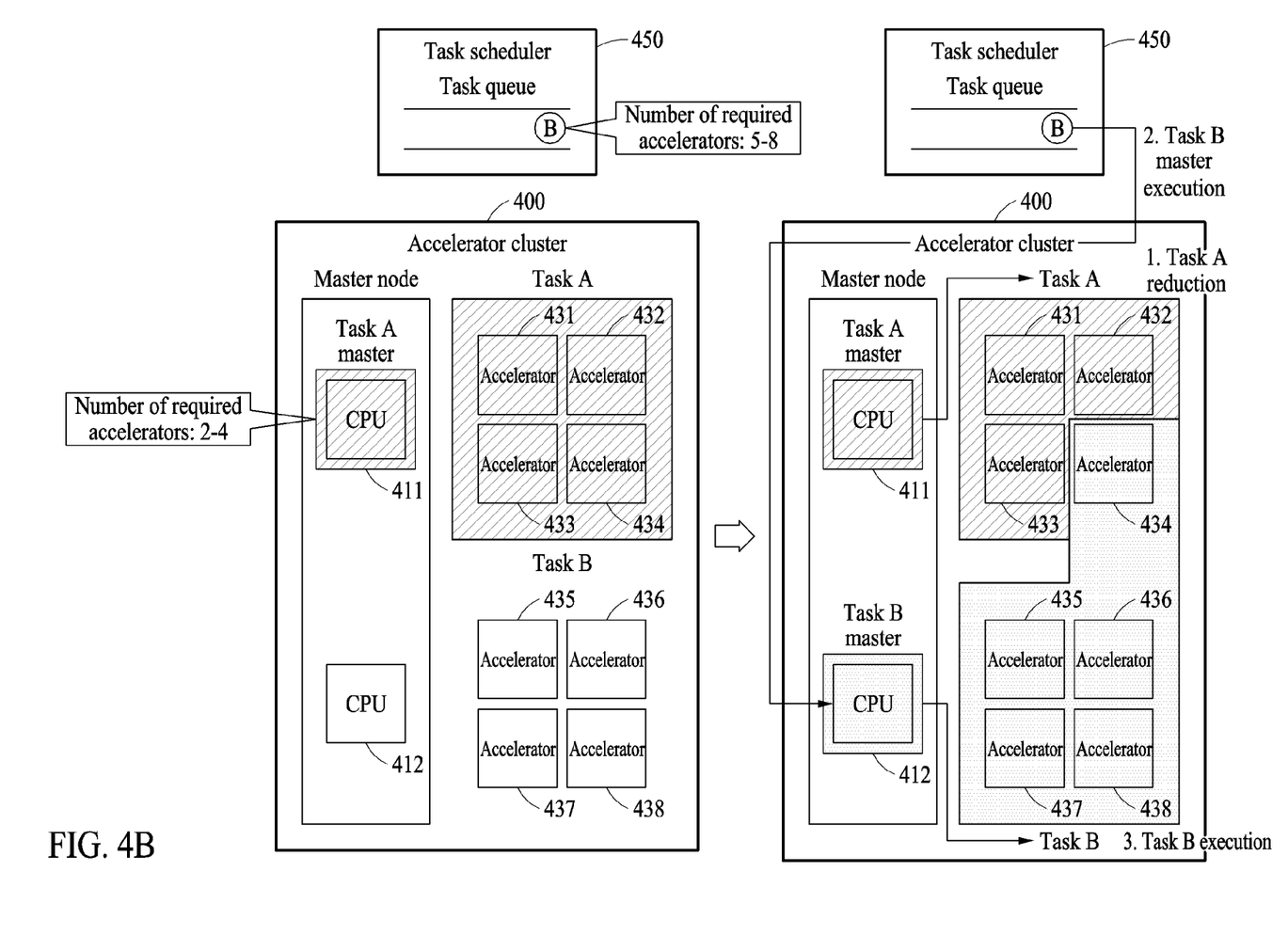
FIG. 4B illustrates another example of an allocation of an accelerator resource.

FIGS. 4A and 4B illustrate examples of an allocation of an accelerator resource.

Referring to FIGS. 4A and 4B, the processor 200 may manage accelerator resources of the accelerator cluster 400. The processor 200 may be provided inside or outside the accelerator cluster 400. For example, as illustrated, the processor 200 includes a task scheduler 450 and a master node. The master node includes a CPU 411 and a CPU 412.

Although the master node is illustrated as including two CPUs in FIGS. 4A and 4B, in other examples, the number of CPUs may be less than or greater than two.

The accelerator cluster 400 includes a plurality of accelerators 431 through 438. Although eight accelerators are illustrated in FIGS. 4A and 4B as being included in the accelerator cluster 400, the number of accelerators included in the accelerator cluster 400 may vary depending on examples.

The processor 200 may allocate an accelerator resource for performing a task based on a utility of a resource allocation that is based on a resource scheduling policy and information on a current resource utilization status of the accelerator cluster 400.

The processor 200 may estimate the utility of the resource allocation based on the resource scheduling policy and the information on the current resource utilization status. The processor 200 may estimate a utility when an additional accelerator resource is allocated to the task, based on the resource scheduling policy and the information on the current resource utilization status.

The processor 200 may also estimate a utility when an accelerator resource is returned by determining whether the task continues when the accelerator resource is returned, based on the resource scheduling policy and the current resource utilization status.

The processor 200 may perform the task by allocating a target accelerator which is at least a portion of accelerators based the estimated utility. The processor 200 may determine the target accelerator from among the accelerators based on the utility.

The processor 200 may allocate, to the target accelerator, the metadata for performing the task.

The processor 200 may determine whether the utility increases by the allocation of the target accelerator. Based on whether the utility increases, the processor 200 may perform the task by allocating the target accelerator to the task.

As illustrated in FIGS. 4A and 4B, the cluster resource manager 210 includes the task scheduler 450. The example of FIG. 4A indicates a situation in which a task queue is empty.

The CPU 411 and the CPU 412 may receive information on a current status of utilization of the accelerators 431 through 438 from the accelerator cluster 400 in real time. For example, when task B is ended, the accelerator cluster 400 may return accelerator resources of the accelerators 431 through 438.

When task B is ended, the CPU 411 may receive information indicating that accelerator resources corresponding to the accelerators 435 through 438 change to idle resources. The CPU 411 may then request the task scheduler 450 for a resource negotiation for the idle resources.

When the accelerators 435 through 438 are additionally allocated to task A, the task scheduler 450 may determine whether such an additional allocation increases a utility (or a utility of a resource allocation) for a user.

When it is determined that the additional allocation of the accelerators 435 through 438 improves the performance of processing task A and increases the utility, the task scheduler 450 may allocate all the accelerators 431 through 438 to task A such that task A is processed rapidly. In such a case, a target accelerator may be all the accelerators 431 through 438.

The example of FIG. 4B indicates a situation in which a task requiring additional five to eight accelerators is waiting in the task queue of the task scheduler 450.

In the example of FIG. 4B, task A may require two to four accelerators. The task scheduler 450 may determine whether reducing the accelerators 431 through 434 allocated to task A increases a utility for a user.

When it is determined that the reduction of the number of accelerators increases the utility, the task scheduler 450 may execute the CPU 412 to perform task B. The CPU 411 may return the accelerator 434 among the accelerators 431 through 434 allocated to task A to reduce the accelerators 431 through 434 allocated to task A.

The CPU 412 may execute task B using the five accelerators 434 through 438 including the returned accelerator 434. In such a case, a target accelerator for task B may be the accelerators 434 through 438.

Figure 5:
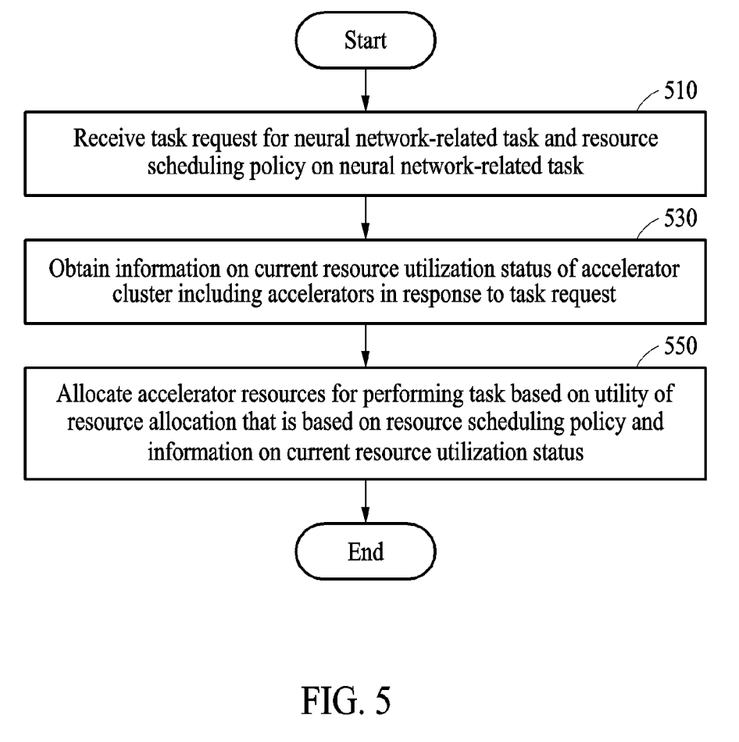
FIG. 5 illustrates an example of operations performed by the accelerator resource management apparatus illustrated in FIG. 1.

FIG. 5 illustrates an example of operations performed by the accelerator resource management apparatus 10 illustrated in FIG. 1. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer, such as a processor, that perform the specified functions, or combinations of special purpose hardware and computer instructions. In addition to the description of FIG. 5 below, the descriptions of FIGS. 1-4 are also applicable to FIG. 5, and are incorporated herein by reference. Thus, the above description may not be repeated here.

Referring to FIG. 5, in operation 510, the receiver 100 receives a task request for a neural network-related task and a resource scheduling policy on the neural network-related task. The task may include neural network-based distributed learning.

The resource scheduling policy may include any one or any combination of a policy on a cost for using the accelerator cluster 400 that is needed for the task, a policy on a time used for the task, or a policy on a throughput of the task.

In operation 530, when the task request is received, the processor 200 obtains information on a current resource utilization status of the accelerator cluster 400 including a plurality of accelerators. For example, the processor 200 may obtain information on another task being executed in the accelerator cluster 400 and information on idle resources of the accelerator cluster 400, in response to the task request.

The processor 200 may obtain the information on the current resource utilization status by performing a peer discovery between the accelerators.

In operation 550, the processor 200 allocates accelerator resources for performing the task based on a utility of such a resource allocation that is based on the resource scheduling policy and the information on the current resource utilization status. The processor 200 may estimate the utility based on the resource scheduling policy and the information on the current resource utilization status.

For example, the processor 200 may estimate a utility in a case of an additional allocation of accelerator resources to the task based on the resource scheduling policy and the information on the current resource utilization status. In another example, the processor 200 may estimate a utility in a case of a return of an accelerator resource by determining whether the task continues when the accelerator resource is returned, based on the resource scheduling policy and the information on the current resource utilization status.

The processor 200 may perform the task by allocating a target accelerator which is at least a portion of the accelerators based on the estimated utility. The processor 200 may determine the target accelerator from among the accelerators based on the utility. The processor 200 may allocate, to the target accelerator, metadata for performing the task.

The processor 200 may determine whether the utility increases by the allocation of the target accelerator. The processor 200 may perform the task by allocating the target accelerator to the task based on whether the utility increases or not.

The processor 200 may synchronize neural network parameters between at least a portion of target accelerators.

The accelerator resource management apparatus, cluster resource manager 210, master 230, negotiator 231, life cycle manager 233, elastic data sharder 235, task scheduler 450, master node, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIM D) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 1-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the accelerator resource management method. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An accelerator resource management method, comprising:
   receiving a task request for a neural network-related task and a resource scheduling policy for the neural network-related task;
   obtaining information on a current resource utilization status of an accelerator cluster comprising a plurality of accelerators in response to the task request, including obtaining information on an other neural network-related task being executed in the accelerator cluster and information on an idle resource of the accelerator cluster; and
   allocating an accelerator resource, including the idle resource, to execute the neural network-related task simultaneously with the other neural network-related task, where the allocating of the accelerator resource is based on a determined improvement in a task performance of a resource allocation, and where the task performance is estimated based on the resource scheduling policy and the information on the current resource utilization status,
   wherein the allocating of the accelerator resource includes selectively reducing one or more accelerators from executing of the other neural network-related task based on a determined utility with respect to the reducing and the task request, and allocating the one or more accelerators to the execution of the neural network-related task based on the determined improvement in the task performance.

2. The method of claim 1, wherein the resource scheduling policy comprises any one or any combination of a policy on a cost for using the accelerator cluster needed for the task, a policy on a time used for the task, and a policy on a throughput of the task.

3. The method of claim 1, wherein the obtaining of the information on the current resource utilization status comprises:
   obtaining the information on the current resource utilization status by performing a peer discovery between the plurality of accelerators.

4. The method of claim 1, wherein the allocating of the accelerator resource comprises:
   performing the task by allocating, to the task, target accelerators that correspond to a portion of the plurality of accelerators based on the estimated task performance.

5. The method of claim 4, wherein the estimating of the task performance comprises any one of:
   estimating a first task performance for an additional allocation of the accelerator resource to the task based on the resource scheduling policy and the information on the current resource utilization status; or
   estimating a second task performance of a return of the accelerator resource by determining whether the task continues in response to the return of the accelerator resource based on the resource scheduling policy and the information on the current resource utilization status.

6. The method of claim 4, wherein the performing of the task comprises:
   determining the target accelerators from among the plurality of accelerators based on the estimated task performance; and
   allocating, to the target accelerators, metadata for performing the task.

7. The method of claim 4, wherein the allocation of the accelerator resource comprises:
   performing the determining of the improvement in the task performance by determining whether the estimated task performance increases by the allocation of the target accelerators, and
   wherein the performance of the task comprises performing the task by allocating the target accelerators to the task, in response to the increase in the task performance being determined.

8. The method of claim 4, wherein the allocating of the accelerator resource further comprises:
   synchronizing neural network parameters between the target accelerators.

9. The method of claim 1, wherein the task comprises neural network-based distributed learning.

10. An accelerator resource management apparatus, comprising:
    a receiver configured to receive a task request for a neural network-related task and a resource scheduling policy for the neural network-related task; and
    a processor configured to:

obtain information on a current resource utilization status of an accelerator cluster comprising a plurality of accelerators in response to the task request, including an obtaining of information on an other neural network-related task being executed in the accelerator cluster and information on an idle resource of the accelerator cluster; and allocate an accelerator resource, including the idle resource, to execute the neural network-related task simultaneously with the other neural network-related other task, where the allocation of the accelerator resource is based on a determined improvement in a task performance of a resource allocation, and where the task performance is estimated based on the resource scheduling policy and the information on the current resource utilization status, wherein, for the allocating of the accelerator resource, the processor is further configured to selectively reduce one or more accelerators from executing of the other neural network-related task based on a determined utility with respect to the reducing and the task request, and allocate the one or more accelerators to the execution of the neural network-related task based on the determined improvement in the task performance.

11. The apparatus of claim 10, wherein the resource scheduling policy comprises any one or any combination of a policy on a cost for using the accelerator cluster needed for the task, a policy on a time used for the task, and a policy on a throughput of the task.

12. The apparatus of claim 10, wherein the processor is further configured to:
obtain the information on the current resource utilization status by performing a peer discovery between the plurality of accelerators.

13. The apparatus of claim 10, wherein the processor is further configured to:
perform the task by allocating, to the task, target accelerators that correspond to a portion of the plurality of accelerators based on the estimated task performance.

14. The apparatus of claim 13, wherein the processor is further configured to:
estimate a first task performance for an additional allocation of the accelerator resource to the task based on the resource scheduling policy and the information on the current resource utilization status; or
estimate a second task performance of a return of the accelerator resource by determining whether the task continues in response to the return of the accelerator resource based on the resource scheduling policy and the information on the current resource utilization status.

15. The apparatus of claim 13, wherein the processor is further configured to:
determine the target accelerators from among the plurality of accelerators based on the estimated task performance; and
allocate, to the target accelerators, metadata for performing the task.

16. The apparatus of claim 13, wherein the processor is further configured to:
performing the determining of the improvement in the task performance by determine whether the estimated task performance increases by the allocation of the target accelerators; and
perform the task by allocating the target accelerators to the task, in response to the increase in the task performance being determined.

17. The apparatus of claim 13, wherein the processor is further configured to:
synchronize neural network parameters between the target accelerators.

18. The apparatus of claim 10, wherein the task comprises neural network-based distributed learning.

19. The method of claim 1, wherein the allocation of the accelerator resource includes allocation of the accelerator resource in at least one aspect of a reduced task time, an increased task speed, and reduced amount of consumption of the accelerator resource to increase the task performance.

* * * * *